United States Patent
Raasakka et al.

(10) Patent No.: US 9,651,671 B2
(45) Date of Patent: May 16, 2017

(54) INTERFERENCE DETECTION USING MULTIPLE AUTOMATIC GAIN CONTROLLERS

(71) Applicant: Honeywell International Inc., Morristown, NJ (US)

(72) Inventors: Jussi Raasakka, Brno (CZ); Martin Orejas, Brno (CZ); Ondrej Kutik, Brno (CZ)

(73) Assignee: Honeywell International Inc., Morris Plains, NJ (US)

( * ) Notice: Subject to any disclaimer, the term of this patent is extended or adjusted under 35 U.S.C. 154(b) by 455 days.

(21) Appl. No.: 14/459,784

(22) Filed: Aug. 14, 2014

(65) Prior Publication Data

US 2016/0047915 A1    Feb. 18, 2016

(51) Int. Cl.
*G01S 19/21* (2010.01)
*H04K 3/00* (2006.01)
*G01S 19/32* (2010.01)

(52) U.S. Cl.
CPC ............... *G01S 19/21* (2013.01); *H04K 3/90* (2013.01); *G01S 19/32* (2013.01)

(58) Field of Classification Search
CPC ............ G01S 19/21; G01S 19/32; H04K 3/90
USPC .................................................... 342/357.59
See application file for complete search history.

(56) References Cited

U.S. PATENT DOCUMENTS

| 8,477,887 B2 | 7/2013 | Challa et al. |
| 2004/0247058 A1* | 12/2004 | Abraham ................ G01S 19/21 375/346 |
| 2006/0209779 A1* | 9/2006 | Rousu ..................... G01S 19/21 370/343 |

(Continued)

FOREIGN PATENT DOCUMENTS

| CN | 103323862 | 9/2013 |
| EP | 2662706 | 11/2013 |

OTHER PUBLICATIONS

Abdizadeh, "GNSS Signal Acquisition in The Presence of Narrowband Interference", UCGE Reports No. 20388, Sep. 2013, pp. i-204, Publisher: Schulich School of Engineering; University of Calgary.

(Continued)

*Primary Examiner* — Harry Liu
(74) *Attorney, Agent, or Firm* — Fogg & Powers LLC

(57) ABSTRACT

A global navigation satellite system (GNSS) receiver includes radio frequency front end and digital processing functionality. Radio frequency front end includes radio frequency input; first variable gain amplifier adjusts first gain of first frequency range of first analog GNSS signal received from radio frequency input by first amount; and second variable gain amplifier adjusts second gain of second frequency range of second analog global navigation satellite system signal received from radio frequency input by second amount. Digital processing functionality compares first amount of adjustment of first gain of first frequency range with second amount of adjustment of second gain of second frequency range; and detects first interference signal present (Continued)

in first frequency range or second frequency range when first amount of adjustment of the first gain of first frequency range differs from second amount of adjustment of second gain of second frequency range by more than first threshold amount.

20 Claims, 3 Drawing Sheets

(56) References Cited

U.S. PATENT DOCUMENTS

| | | | |
|---|---|---|---|
| 2009/0104869 A1* | 4/2009 | Li | G01S 19/21 455/1 |
| 2011/0102259 A1 | 5/2011 | Ledvina et al. | |
| 2012/0121087 A1 | 5/2012 | Psiaki | |
| 2013/0148763 A1* | 6/2013 | Gunawardena | H04B 1/10 375/340 |
| 2015/0124914 A1* | 5/2015 | Arslan | H04B 15/06 375/346 |
| 2016/0154111 A1* | 6/2016 | Zehnpfennig | G01S 19/215 342/357.59 |

OTHER PUBLICATIONS

Abdizadeh et al., "New Decision Variables for GNSS Acquisition in the Presence of CW Interference", at least as early as May 2014, pp. 1-14, Publisher: IEEE.

Akos, "Who's Afraid of the Spoofer? GPS/GNSS Spoofing Detection via Automatic Gain Control (AGC)", "Journal of The Institute of Navigation", at least as early as Dec. 2012, pp. 281-291, vol. 59, No. 4, Winter 2012.

Bastide et al., "Automatic Gain Control (AGC) as an Interference Assessment Tool", "ION GPS/GNSS", Sep. 9-12, 2003, pp. 2042-2053.

Borowski et al., "Detecting False Signals with Automatic Gain Control", "GPS World", Apr. 1, 2012, pp. 1-12, available at http://gpsworld.com/detecting-false-signals-automatic-gain-control-12804/.

"N.J. Man in a Jam, After Illegal GPS Device Interferes With Newark Liberty Operations", "retrieved Jun. 24, 2014 from http://newyork.cbslocal.com/2013/08/09/n-j-man-in-a-jam-after-illegal-gps-device-interferes-with-newark-liberty-operations/", Aug. 9, 2013, pp. 1-4.

"GPS Privacy Jammers and RFI at Newark: Navigation Team AJP-652 Results", Mar. 2011, pp. 1-18, Publisher: Federal Aviation Administration.

"European GNSS (Galileo) Open Service: Signal in Space Interface Control Document", "Retrieved from http://ec.europa.eu/enterprise/policies/satnav/galileo/files/galileo-os-sis-icd-issue1-revision1_en.pdf", Sep. 2010, pp. i-196.

Golijan, "Cheap GPS trick sends $80 million superyacht off course", Retrieved Jun. 24, 2014 from URL: http://www.nbcnews.com/technology/cheap-gps-trick-sends-80-million-superyacht-course-f6C10796390, first published Jul. 30, 2013.

Isoz, "Interference detection and localization in the GPS L1 frequency band", Feb. 2012, pp. i-112, Publisher: Lulea University of Technology: Dept. of Computer Science, Electrical Engineering and Space Technology.

Kerns et al., "Unmanned Aircraft Capture and Control via GPS Spoofing", "Journal of Field Robotics", Apr. 10, 2014, pp. 1-29, vol. 31, No. 4.

Ndili et al., "GPS Receiver Autonomous Interference Detection", "Position Location and Navigation Symposium", Apr. 20-23 1998, pp. 123-130.

Yang et al., "Intentional GNSS Interference Detection and Characterization Algorithm Using AGC and Adaptive IIR Notch Filter", "International Journal of Aeronautical & Space Sciences", at least as early as Dec. 2012, pp. 491-498, vol. 13, No. 4.

European Patent Office, "Extended European Search Report from EP Application No. 15179591.1 mailed Jan. 19, 2016", "from Foreign Counterpart of U.S. Appl. No. 14/459,784", filed Jan. 19, 2016, pp. 1-5, Published in: EP.

Psiaki et al, "GPS Spoofing Detection Via Dual-Receiver Correlation of Military Signals", "IEEE Transactions on Aerospace and Electronic Systems", Oct. 1, 2013, pp. 2250-2267, vol. 49, No. 4, Publisher: IEEE, Published in: US.

European Patent Office, "Communication Under Rule 71(3) EPC from EP Application No. 15179591.1 mailed Jun. 23, 2016", "from Foreign Counterpart of U.S. Appl. No. 14/459,784", filed Jun. 23, 2016, pp. 1-39, Published in: EP.

* cited by examiner

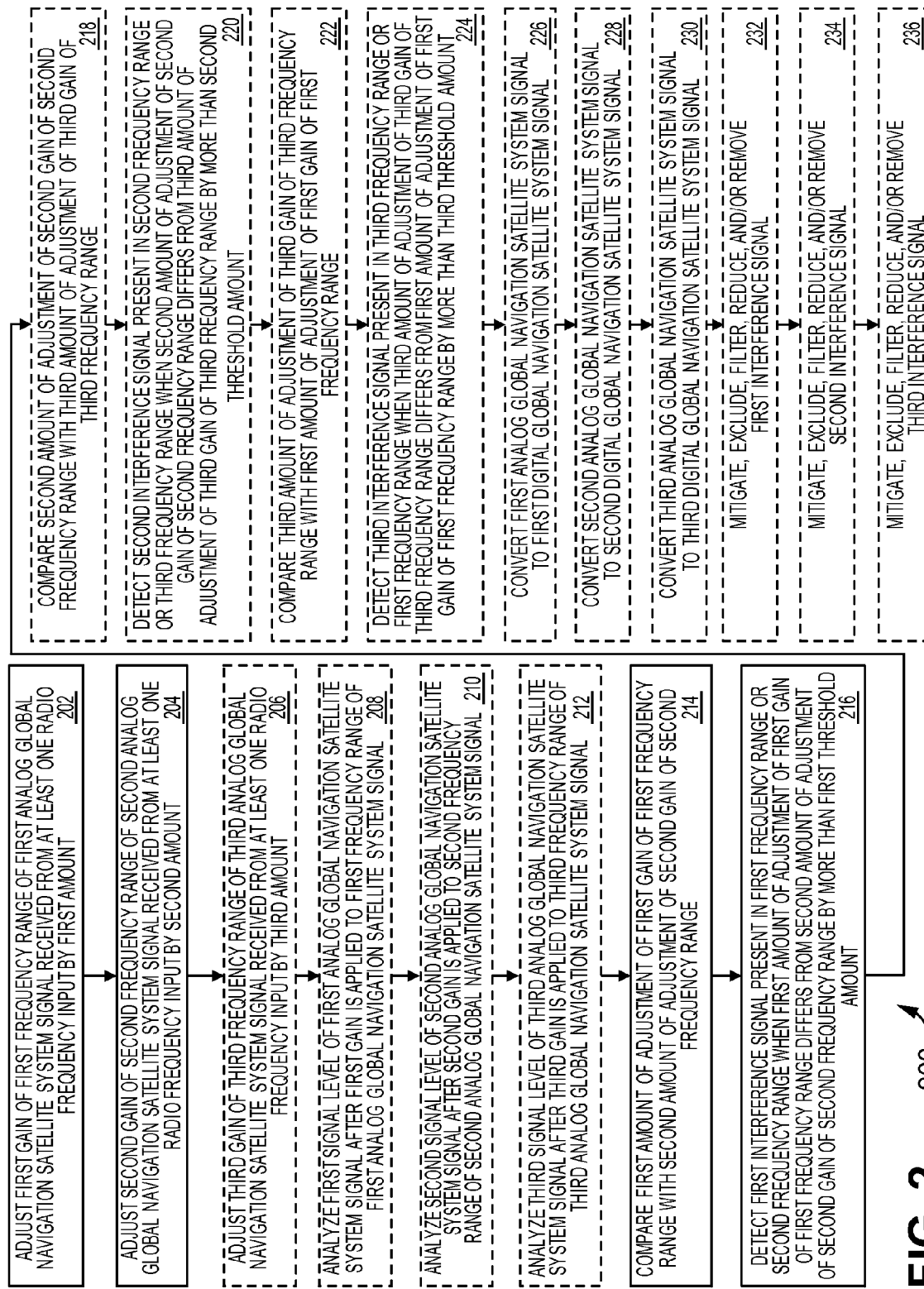
FIG. 2    200

INTERFERENCE DETECTION USING MULTIPLE AUTOMATIC GAIN CONTROLLERS

BACKGROUND

Interference is becoming a serious threat for current Global Navigation Satellite System (GNSS) receivers. One of the more serious threats is the ever increasing number of personal GNSS jammers used by people to block the possibility of monitoring their movements using GNSS receivers. The careless use of personal GNSS jammers can cause serious problems for airborne GNSS receivers. In addition, spoofing methods are used to trick GNSS receivers into producing false information. Spoofing can be used to steer ships off course or bring down aircraft. These types of attacks will likely become more common as GNSS receivers are more heavily relied on to provide users with accurate and reliable positioning and velocity information.

SUMMARY

A global navigation satellite system (GNSS) receiver includes a radio frequency front end and a digital processing functionality. The radio frequency front end includes at least one radio frequency input; a first variable gain amplifier configured to adjust a first gain of a first frequency range of a first analog global navigation satellite system signal received from the at least one radio frequency input by a first amount; and a second variable gain amplifier configured to adjust a second gain of a second frequency range of a second analog global navigation satellite system signal received from the at least one radio frequency input by a second amount. The digital processing functionality is configured to compare the first amount of adjustment of the first gain of the first frequency range with the second amount of adjustment of the second gain of the second frequency range; and detect a first interference signal present in the first frequency range or the second frequency range when the first amount of adjustment of the first gain of the first frequency range differs from the second amount of adjustment of the second gain of the second frequency range by more than a first threshold amount.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 2 is a flow diagram illustrating one exemplary embodiment of a method of detecting an interference signal present in a first frequency of a first analog GNSS signal received from at least one radio frequency input.

Figure 1A:
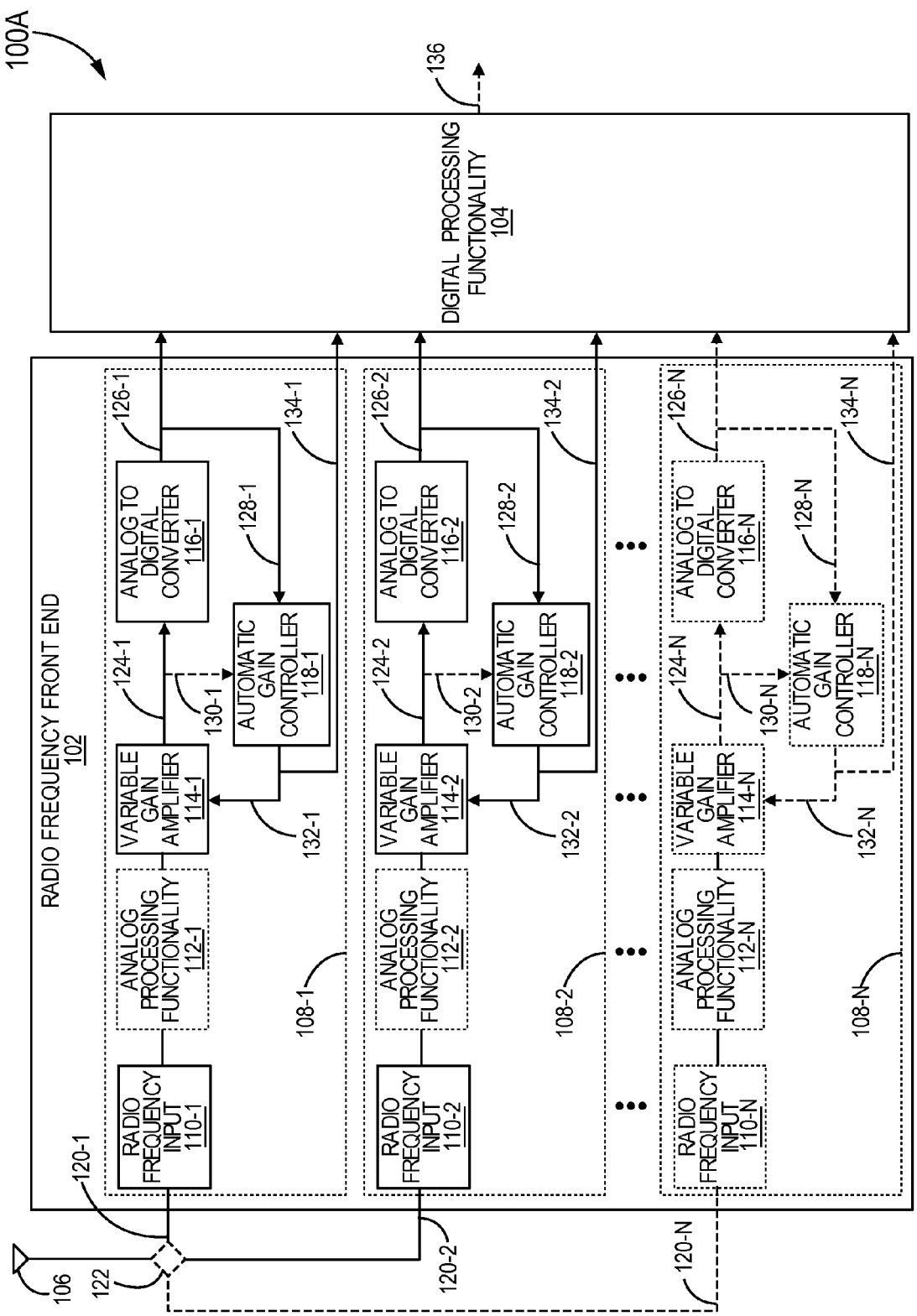
FIG. 1A is a block diagram of an exemplary embodiment of a global navigation satellite system (GNSS) receiver.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

In exemplary embodiments, Global Navigation Satellite Systems (GNSS) described herein include the United States' Global Positioning System (GPS), Russia's Global'naya Navigatsionnaya Sputnikovaya Sisterna (GLONASS), China's Beidou (Compass), the European Union's Galileo, France's Doppler Orbitography and Radio-positioning Integrated by Satellite (DORIS), India's Indian Regional Navigational Satellite System (IRNSS), and Japan's Quasi-Zenith Satellite System (QZSS). In exemplary embodiments implementing GPS, L1 signals (operating around 1.57542 GHz) and/or L2 signals (operating around 1.2276 GHz) and/or L5 signals (operating around 1.17645 GHz) are implemented. In exemplary embodiments implementing GLONASS, signals at a first frequency (operating around 1.602 GHz) and/or signals at a second frequency (operating around 1.246 GHz) are implemented. In exemplary embodiments implementing COMPASS, B1 signals (operating around 1.561098 GHz), B1-2 signals (operating around 1.589742 GHz), B2 signals (operating around 1.20714 GHz) and/or B3 signals (operating around 1.26852 GHz) are implemented. In other exemplary embodiments implementing COMPASS, B1 signals operate at GPS L1 frequencies (around 1.57542 GHz) and B2 signals operate at Galileo E5b frequencies (around 1.164-1.215 GHz). In exemplary embodiments implementing Galileo, E5a and E5b signals (operating around 1.164-1.215 GHz), E6 signals (operating around 1.260-1.300 GHz), and/or E2-L1-E1 signals (operating around 1.559-1.592 GHz) are implemented.

As described above, both jamming and spoofing can lead to false information being produced by GNSS receivers. To avoid false information, GNSS receivers should detect and mitigate, exclude, filter, reduce, and/or remove jamming and spoofing signals before the receiver ceases to work or produces misleading information. This is particularly relevant for safety applications, including aviation. Example interference includes when some new signal power is being added to a frequency band. Interference mitigation techniques should only be applied when it is likely that an interfering source is present. Otherwise, these mitigation techniques might reduce the performance of the GNSS receiver. Mitigation techniques could erroneously filter out not only potential interference, but also useful GNSS signals. If frequency filtering is applied unnecessarily, it can lead to a degradation of the receiver performance. Because of the aforementioned reasons, it is beneficial that a GNSS receiver can detect the presence of interference with high confidence and reliability.

FIG. 1A is a block diagram of an exemplary embodiment of a global navigation satellite system (GNSS) receiver 100A. Exemplary GNSS receiver 100A includes a radio frequency front end 102 and a digital processing functionality 104. Radio frequency front end 102 is communicatively coupled between at least one antenna 106 and the digital processing functionality 104. In exemplary embodiments, the radio frequency front end 102 includes a plurality of radio frequency signal paths 108 (including radio frequency signal path 108-1, radio frequency signal path 108-2, and any quantity of additional radio frequency signal paths 108 through optional radio frequency signal path 108-N), a plurality of radio frequency inputs 110 (including radio frequency input 110-1, radio frequency input 110-2, and any quantity of additional radio frequency inputs 110 through optional radio frequency input 110-N), a plurality of optional analog processing functionalities 112 (including optional analog processing functionality 112-1, optional analog processing functionality 112-2, and any quantity of additional optional analog processing functionalities 112 through optional analog processing functionality 112-N), a plurality of variable gain amplifiers 114 (including variable gain amplifier 114-1, variable gain amplifier 114-2, and any quantity of additional optional variable gain amplifiers 114 through optional variable gain amplifier 114-N), a plurality of analog to digital converters (ADC) 116 (including analog to digital converter 116-1, analog to digital converter 116-2, and any quantity of optional analog to digital converters 116 through optional analog to digital converter 116-N), a plurality of automatic gain controllers (AGC) 118 (including automatic gain controller 118-1, automatic gain controller 118-2, and any quantity of optional automatic gain controllers 118 through optional automatic gain controller 118-N).

In exemplary embodiments, each radio frequency signal path 108 includes a radio frequency input 110, an optional analog processing functionality 112, a variable gain amplifier 114, an analog to digital converter 116, and an automatic gain controller 118. In exemplary embodiments, each radio frequency signal path 108 is distinct from one another and handles a different GNSS frequency by adjusting the signal level of the GNSS signals received using an automatic gain controller. In exemplary implementations, the different GNSS frequencies used by the various radio frequency signal paths can be separated by hundreds of megahertz. In other implementations, the different GNSS frequencies used by the various radio frequency signal paths are separated by different amounts of frequency. The digital processing functionality 104 is configured to monitor the gain levels of different GNSS frequencies in the radio frequency signal paths 108 and to determine whether a significant change (for example a change above a certain threshold) is seen in the gain levels of at least one of the radio frequency signal paths 108. If the change in the gain level of that particular frequency signal path 108 is not consistent with all the other radio frequency signal paths 108 for the other GNSS frequencies, it is determined that the GNSS frequency band in that particular frequency signal path 108 is being affected by interference.

If the change in the gain level of a particular frequency signal path 108 is consistent with all the other radio frequency signal paths 108, then there is not an interference signal present in the GNSS frequency band in that particular frequency signal path. Further, if the change in the gain level of all the frequency signal paths 108 is consistent, it is determined that there is no interference signal present on any of the GNSS frequency bands. In this case, it is assumed that the change in the gain level that is consistent across all the frequency signal paths 108 is due to the change in the operational environment and not an interference signal. In exemplary embodiments, even with temperature, pressure, humidity, and/or other environmental changes, the changes in gain levels at the various GNSS frequencies will still be slightly different, though very similar. In exemplary embodiments, the decibel (dB) changes between the gain levels in two different GNSS frequencies through two different radio frequency signal paths 108 will not be exactly the same when an environmental change (such as temperature, pressure, and/or humidity) is the cause of the change in signal level through the radio frequency signal path 108. In exemplary embodiments, a threshold or tolerance region is used to define the allowable difference between the change in signal level through the radio frequency signal paths 108. In exemplary implementations, a tolerance region of +/−0.5 dB is allowed between two frequency bands without deciding that an interference signal is causing the difference in change in signal level. In other implementations, larger or smaller tolerance regions and/or thresholds are used.

In exemplary embodiments, the radio frequency signal paths 108, and more specifically the radio frequency inputs 110, are communicatively coupled to the at least one antenna 106 through a plurality of signal lines 120 (including signal line 120-1, signal line 120-2, and any quantity of optional signal lines 120 through optional signal line 120-N). In exemplary embodiments, the plurality of signal lines 120 are communicatively coupled to the at least one antenna 106 through an optional diplexer/splitter 122 that splits the signals received via the at least one antenna 106 and communicates various signals down the various signal lines 120 as appropriate. In exemplary embodiments, signals within a first frequency band are split off by the optional diplexer/splitter 122 and are communicated to the radio frequency input 110-1 across the signal line 120-1 while signals within a second frequency band are split off by the optional diplexer/splitter 122 and are communicated to the radio frequency input 110-2 across the signal line 120-2. In exemplary embodiments, signals within additional frequency bands are split off by the optional diplexer/splitter 122 and are communicated to radio frequency inputs 110 via signal lines 120. In other exemplary embodiments, the optional diplexer/splitter 122 is within the radio frequency front end 102 and the radio frequency font end 102 only includes a single radio frequency input 110.

In exemplary embodiments including optional analog processing functionalities 112, each radio frequency input is communicatively coupled to a corresponding variable gain amplifier 114 through the optional analog processing functionalities 112. In exemplary embodiments, the optional analog processing functionalities 112 include at least one of mixers, amplifiers, and filters. In exemplary embodiments, the analog processing functionalities 112 down convert radio frequency (RF) signals received from the at least one antenna 106 to intermediate frequency (IF) signals. In other embodiments, the radio frequency (RF) signals are down-converted using direct conversion directly to baseband without going to an intermediate frequency.

In exemplary embodiments, the variable gain amplifiers 114 are configured to receive analog GNSS signals from the radio frequency inputs 110 and/or optional analog processing functionalities 112 and to apply gains to frequency ranges within the analog GNSS signals. More specifically, variable gain amplifier 114-1 is configured to receive a first analog GNSS signal from radio frequency input 110-1 either directly or through optional analog processing functionality 112-1. Similarly, variable gain amplifier 114-2 is configured to receive a second analog global navigation satellite system (GNSS) signal from radio frequency input 110-2 either directly or through optional analog processing functionality 112-2. In exemplary embodiments, additional analog global navigation satellite system (GNSS) signals are received by additional optional variable gain amplifiers 114 either directly or through optional analog processing functionalities 112.

In exemplary embodiments, each variable gain amplifier 114 is configured to apply a gain to the analog GNSS signals received from the corresponding radio frequency input 110 based on a gain signal received from a corresponding automatic gain controller 118. More specifically, variable gain amplifier 114-1 is configured to apply a first gain to the first analog GNSS signal based on a first gain signal received from the automatic gain controller 118-1. Similarly, variable gain amplifier 114-2 is configured to apply a second gain to the second analog GNSS signal based on a second gain signal received from the automatic gain controller 118-2. In exemplary embodiments, additional variable gain amplifiers 114 are configured to apply additional gains to additional analog GNSS signals based on corresponding gain signals received from additional automatic gain controllers 118.

In exemplary embodiments, each analog to digital converter (ADC) 116 is configured to receive gain adjusted analog GNSS signals from corresponding variable gain amplifiers 114 and to convert the gain adjusted analog GNSS signals to digital global navigation satellite system (GNSS) signals. More specifically, analog to digital converter 116-1 is configured to receive a first gain adjusted analog GNSS signal from variable gain amplifier 114-1 across signal line 124-1. Analog to digital converter 116-1 is further configured to convert the first gain adjusted analog GNSS signal into a first digital GNSS signal. Similarly, analog to digital converter 116-2 is configured to receive a second gain adjusted analog GNSS signal from variable gain amplifier 114-2 across signal line 124-2. Analog to digital converter 116-2 is further configured to convert the second gain adjusted analog GNSS signal into a second digital GNSS signal. In exemplary embodiments, additional analog to digital converters 116 are configured to receive and convert additional gain adjusted analog GNSS signals into additional digital GNSS signals.

In exemplary embodiments, each analog to digital converter 116 is further configured to communicate the digital GNSS signals to the digital processing functionality 104 across signal lines 126 (including signal line 126-1, signal line 126-2, and any quantity of optional signal lines 126 through optional signal line 126-N). In exemplary embodiments, each analog to digital converter 116 is further configured to communicate the digital GNSS signals to a corresponding automatic gain controller 118 across corresponding signal lines 128 (including signal line 128-1, signal line 128-2, and any quantity of optional signal lines 128 through optional signal line 128-N). Specifically, analog to digital converter 116-1 is configured to communicate the first digital GNSS signal to the automatic gain controller 118-1 across the signal line 128-1. Similarly, analog to digital converter 116-2 is configured to communicate the second digital GNSS signal to the automatic gain controller 118-2 across the signal line 128-2. In exemplary embodiments, additional analog to digital converters 116 are configured to communicate additional digital GNSS signals to additional automatic gain controllers 118 across additional signal lines 128.

In exemplary embodiments, each automatic gain controller 118 is configured to maintain the signal energy going to the corresponding analog to digital converter 116 constant despite variations in the incoming signal energy. Each automatic gain controller 118 achieves this by adjusting the gain in one or multiple gain stages in the radio frequency front end 102 of the GNSS receiver 100A. In exemplary embodiments, the analog to digital converters 116 receive constant energy to maintain optimal quantization for further digital signal processing. Interference signals will increase (or decrease) the input signal energy if they are within the bandwidth of the relevant frequency range of a particular signal path of the GNSS receiver 100A. In exemplary embodiments, this will result in a corresponding decrease (or increase) in the automatic gain control gain level in an attempt to keep the signal energy constant. The increase and/or decrease in the gain level determined by a particular automatic gain controller 118 can be used to detect interference signals present in the bandwidth of the relevant frequency range of a particular signal path of the GNSS receiver 100A. Detection of interference signals can be complicated by changes in the operational environment. For example, changes in outside temperature, pressure, and/or humidity (among other environmental changes) can have an effect on the amplifier gains within the radio frequency front end 102. Blockage of the GNSS receiver antenna can also affect the analog input signal level. GNSS receiver 100A is configured to distinguish between normal changes in operational environment and interference signal conditions, which enable increased reliability and performance of interference detection as described below with reference to the digital processing functionality 104.

In exemplary embodiments, each automatic gain controller 118 is configured to receive the digital GNSS signals from a corresponding analog to digital converter 116 across a corresponding signal line 128. Each automatic gain controller 118 is further configured to analyze the corresponding digital GNSS signal and generate a gain signal for the corresponding variable gain amplifier 114 based on the analysis of the corresponding digital GNSS signal. In exemplary embodiments, the analysis of the digital GNSS signal includes a comparison of an average signal level with a desired signal level for input into the digital processing functionality. Each automatic gain controller 118 is further configured to communicate the first gain signal to the corresponding variable gain amplifier 114. In exemplary embodiments, the automatic gain controllers 118 may be set and/or biased to different gain levels at initialization.

More specifically, automatic gain controller 118-1 is configured to receive the first digital GNSS signal from the analog to digital converter 116-1 across the signal line 128-1. The automatic gain controller 118-1 is further configured to analyze the first digital GNSS signal and generate the first gain signal for the variable gain amplifier 114-1 based on the analysis of the first digital GNSS signal. The automatic gain controller 118-1 is further configured to communicate the first gain signal to the variable gain amplifier 114-1. Similarly, automatic gain controller 118-2 is configured to receive the second digital GNSS signal from the analog to digital converter 116-2 across the signal line 128-2. The automatic gain controller 118-2 is further configured to analyze the second digital GNSS signal and generate the second gain signal for the variable gain amplifier 114-2 based on the analysis of the second digital GNSS signal. The automatic gain controller 118-2 is further configured to communicate the second gain signal to the variable gain amplifier 114-2. In exemplary embodiments, additional automatic gain controllers 118 are configured to receive additional digital GNSS signals from corresponding analog to digital converters 116 across the corresponding signal lines 128. The additional automatic gain controllers 118 are further configured to analyze the corresponding digital GNSS signals and generate gain signals for the corresponding variable gain amplifiers 114 based on the analysis of the corresponding digital GNSS signals. The additional automatic gain controllers 118 are further configured to communicate the corresponding gain signals to the corresponding variable gain amplifiers 114.

In exemplary embodiments, each automatic gain controller 118 is configured to receive the gain adjusted analog GNSS signals from the corresponding variable gain amplifier 114 across a corresponding signal line 130 (including signal line 130-1, signal line 130-2, and any quantity of optional signal lines 130 through optional signal line 130-N) instead of, or in addition to, being configured to receive the corresponding digital GNSS signal from the corresponding analog to digital converter 116 across a corresponding signal line 128. Each automatic gain controller 118 is further configured to analyze the corresponding gain adjusted analog GNSS signal and generate a gain signal for the corresponding variable gain amplifier 114 based on the analysis of the corresponding analog GNSS signal. In exemplary embodiments, the analysis of the gain adjusted analog GNSS signal includes a comparison of an average signal level with a desired signal level for input into the digital processing functionality. Each automatic gain controller 118 is further configured to communicate the first gain signal to the corresponding variable gain amplifier 114.

More specifically, automatic gain controller 118-1 is configured to receive the first gain adjusted analog GNSS signal from the variable gain amplifier 114-1 across the signal line 130-1. The automatic gain controller 118-1 is further configured to analyze the first gain adjusted analog GNSS signal and generate the first gain signal for the variable gain amplifier 114-1 based on the analysis of the first gain adjusted analog GNSS signal. The automatic gain controller 118-1 is further configured to communicate the first gain signal to the variable gain amplifier 114-1. Similarly, automatic gain controller 118-2 is configured to receive the second gain adjusted analog GNSS signal from the variable gain amplifier 114-2. The automatic gain controller 118-2 is further configured to analyze the second gain adjusted analog GNSS signal and generate the second gain signal for the variable gain amplifier 114-2 based on the analysis of the second gain adjusted analog GNSS signal. The automatic gain controller 118-2 is further configured to communicate the second gain signal to the variable gain amplifier 114-2. In exemplary embodiments, additional automatic gain controllers 118 are configured to receive additional gain adjusted analog GNSS signals from corresponding variable gain amplifiers 114 across the corresponding signal lines 130. The additional automatic gain controllers 118 are further configured to analyze the corresponding gain adjusted analog GNSS signals and generate gain signals for the corresponding variable gain amplifiers 114 based on the analysis of the corresponding gain adjusted analog GNSS signals. The additional automatic gain controllers 118 are further configured to communicate the corresponding gain signals to the corresponding variable gain amplifiers 114.

In other exemplary embodiments, at least one of the automatic gain controllers 118 is configured to receive the corresponding digital GNSS signal from the corresponding analog to digital converter 116 across a corresponding signal line 128 while at least one of the automatic gain controllers 118 is configured to receive the gain adjusted analog GNSS signals from the corresponding variable gain amplifier 114 across a corresponding signal line 130. In exemplary embodiments, one or more of the pairs of variable gain amplifiers 114 and automatic gain controllers 118 are replaced by other types of automatic gain control circuits and/or functionality.

In exemplary embodiments, each automatic gain controller 118 is further configured to communicate the corresponding gain signals to the digital processing functionality. More specifically, automatic gain controller 118-1 is configured to communicate the first gain signal to the digital processing functionality 104, automatic gain controller 118-2 is configured to communicate the second gain signal to the digital processing functionality 104, and any additional optional automatic gain controllers 118 are configured to communicate corresponding gain signals to the corresponding variable gain amplifiers 114.

In exemplary embodiments, digital processing functionality 104 includes a processing unit that includes or functions with software programs, firmware or other computer readable instructions for carrying out various methods, process tasks, calculations, and control functions, used in the digital processing functionality described herein. These instructions are typically stored on any appropriate computer readable medium used for storage of computer readable instructions or data structures. The computer readable medium can be implemented as any available media that can be accessed by a general purpose processor (GPP) or special purpose computer or processor (such as a field-programmable gate array (FPGA), application-specific integrated circuit (ASIC) or other integrated circuit), or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), and flash memory, etc. Suitable processor-readable media may also include transmission media such as electrical, electromagnetic, or digital signals, conveyed via a communication medium such as a network and/or a wireless link.

In exemplary embodiments, digital processing functionality 104 compares the change in gain signals received from a plurality of automatic gain controllers 118 to detect a first interference signal present in one of the analog GNSS signals. Operational environment changes are more likely to have a clear positive correlation for all frequencies used by the GNSS receiver 100A. More specifically, operational environment changes are shown across all frequencies used by the GNSS receiver 100A. In contrast, interference signals have determined spectral and temporal characteristics which can be exploited in interference detection algorithms. Exemplary multi-frequency GNSS receivers 100A operate in multiple frequency bands which are separated by hundreds of Megahertz (MHz). In exemplary embodiments, interference signals do not have enough bandwidth to cover all GNSS frequency bands at once, and thus can affect only one part of the GNSS receiver signal processing chain. Dedicated GNSS jammers that are targeted for all GNSS frequencies will most likely have different temporal and spectral characteristics for each GNSS frequency band. This information can be used to distinguish between changes in the operational environment and interference signals in the GNSS receiver 100A.

In exemplary embodiments, if similar energy content change (resulting in a positive correlation) is seen in multiple GNSS frequencies in the various radio frequency signal paths 108 at the same time, it can be determined to be caused by a change in the operational environment of the GNSS receiver 100A. In contrast, if the change in the energy content is uncorrelated between GNSS receiver frequency bands, it can be determined to be caused by an interference signal. In exemplary embodiments, the GNSS frequency band in a particular radio frequency signal path 108 in which the interference signal is present can be detected by the increased (or reduced) energy content in the GNSS frequency band in question. This is due to the fact that interference signals will, in practice, add (or cancel out) energy in the frequency band.

In exemplary implementations, the digital processing functionality 104 is configured to compare a first amount of adjustment of a first gain signal received from automatic gain controller 118-1 with a second amount of adjustment of a second gain signal received from automatic gain controller 118-2. In exemplary implementations, the digital processing functionality 104 is further configured to detect a first interference signal present in the first analog GNSS signal in the first signal path 108-1 or the second analog GNSS signal in the second signal path 108-2 when the first amount of adjustment of the first gain signal in the first signal path 108-1 differs from the second amount of adjustment of the second gain signal in the second signal path 108-2 by more than a first threshold amount. In exemplary implementations, the digital processing functionality 104 is configured to compare the first amount of adjustment of the first gain signal in the first signal path 108-1 with the second amount of adjustment of the second gain signal in the second signal path 108-2 by correlating the first amount of adjustment of the first gain signal in the first signal path 108-1 with the second amount of adjustment of the second gain signal in the second signal path 108-2.

In exemplary implementations, the digital processing functionality 104 is further configured to compare the second amount of adjustment of the second gain signal received from the automatic gain controller 118-2 with a third amount of adjustment of a third gain signal received from automatic gain controller 118-3. In exemplary implementations, the digital processing functionality 104 is further configured to detect a second interference signal present in the second analog GNSS signal in the second signal path 108-2 or the third analog signal in the third signal path 108-3 when the second amount of adjustment of the second gain signal in the second signal path 108-2 differs from the third amount of adjustment of the third gain signal in the third signal path 108-3 by more than a second threshold amount. In exemplary implementations, the digital processing functionality 104 is configured to take into account whether a first interference signal was present in the first analog GNSS signal in the first signal path 108-1 or the second analog GNSS signal in the second signal path 108-2 when making the decision whether or not a second interference signal is present in the second analog GNSS signal in the second signal path 108-2 or the third analog GNSS signal in the third signal path 108-3. In exemplary implementations, the digital processing functionality 104 is configured to compare the second amount of adjustment of the second gain signal in the second signal path 108-2 with the third amount of adjustment of the third gain signal in the third signal path 108-3 by correlating the second amount of adjustment of the second gain signal in the second signal path 108-2 with the third amount of adjustment of the third gain signal in the third signal path 108-3.

In exemplary implementations, the digital processing functionality 104 is further configured to compare the third amount of adjustment of the third gain signal received from the automatic gain controller 118-3 with the first amount of adjustment of the first gain signal received from the automatic gain controller 118-1. In exemplary implementations, the digital processing functionality 104 is further configured to detect a third interference signal present in the third analog GNSS signal in the third signal path 108-3 or the first analog signal in the first signal path 108-1 when the third amount of adjustment of the third gain signal in the third signal path 108-3 differs from the first amount of adjustment of the first gain signal in the first signal path 108-3 by more than a second threshold amount. In exemplary implementations, the digital processing functionality 104 is configured to take into account whether a first interference signal or a second interference signal was present in the first analog GNSS signal in the first signal path 108-1, the second analog GNSS signal in the second signal path 108-2, and/or the third analog GNSS signal in the third signal path 108-3 when making the decision whether or not a third interference signal is present in the third analog GNSS signal in the third signal path 108-3 or the first analog GNSS signal in the first signal path 108-1. In exemplary implementations, the digital processing functionality 104 is configured to compare the third amount of adjustment of the third gain signal in the third signal path 108-3 with the first amount of adjustment of the first gain signal in the first signal path 108-1 by correlating the third amount of adjustment of the third gain signal in the third signal path 108-3 with the first amount of adjustment of the first gain signal in the first signal path 108-1.

While permutations based on three signal paths 108 with three analog GNSS signals and three gain adjustments are described above, it is understood that in other embodiments with additional signal paths 108, analog GNSS signals, and gain adjustments, additional permutations will be calculated to determine whether interference signals are present in the various analog GNSS signals going through the various signal paths 108.

In exemplary embodiments, the digital processing functionality 104 performs the evaluation of whether or not an interference signal is present in the GNSS signals periodically, such as once per millisecond. If the determination is made that an interference signal is present, an alarm can be triggered. In exemplary embodiments, the digital processing functionality 104 mitigates, excludes, filters, reduces, and/or removes the first interference and/or the second interference once detection of the first interference and/or second interference occurs. In exemplary embodiments, the digital processing functionality solves for the position of the GNSS receiver 100A and outputs the position on optional signal line 136.

Figure 1B:
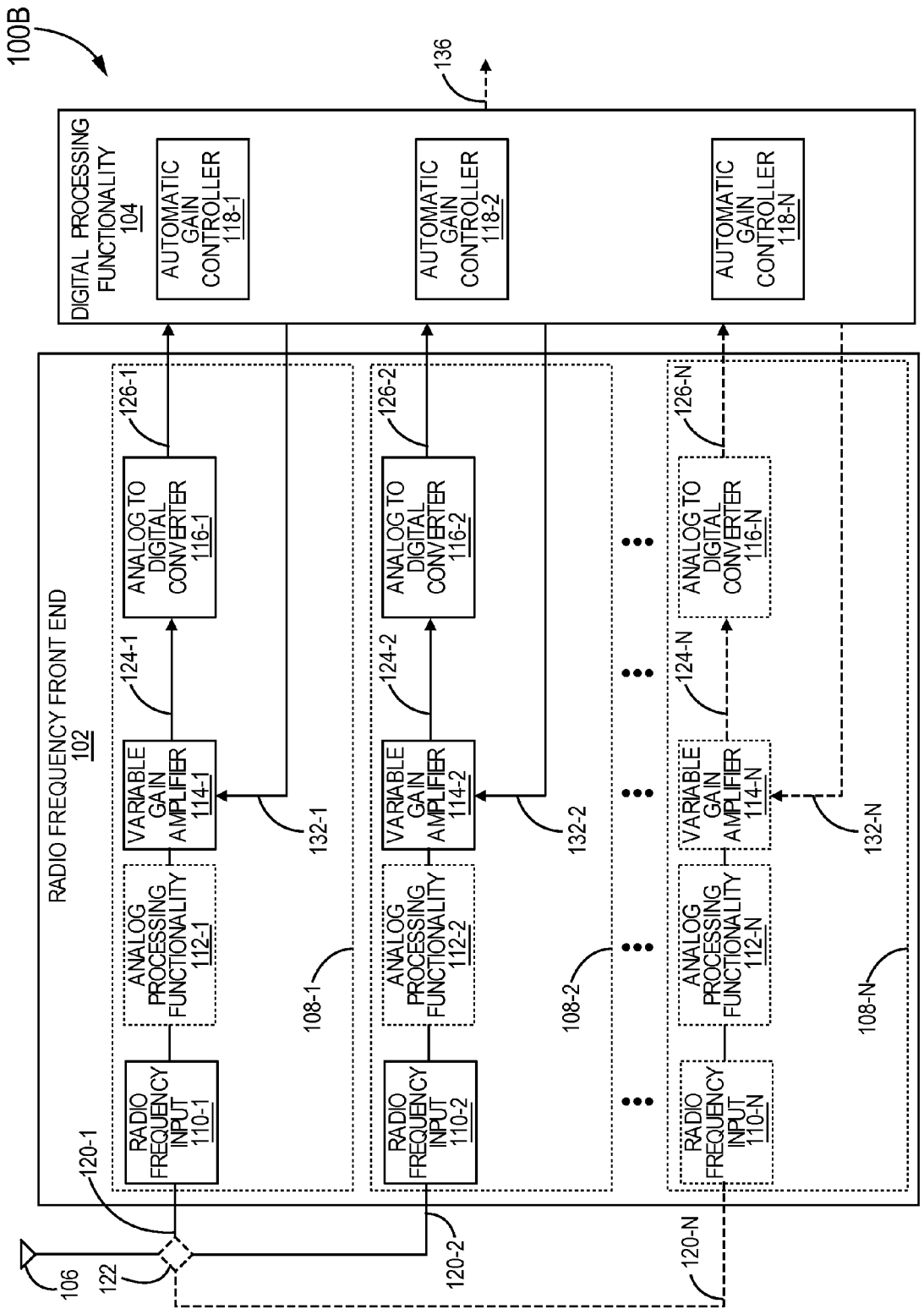
FIG. 1B is a block diagram of another exemplary embodiment of a GNSS receiver.

FIG. 1B is a block diagram of an exemplary embodiment of a GNSS receiver 100B. Exemplary GNSS receiver 100B includes the radio frequency front end 102 and the digital processing functionality 104. Radio frequency front end 102 is communicatively coupled between at least one antenna 106 and the digital processing functionality 104. In exemplary embodiments, the radio frequency front end 102 includes a plurality of radio frequency inputs 110 (including radio frequency input 110-1, radio frequency input 110-2, and any quantity of additional radio frequency inputs 110 through optional radio frequency input 110-N), a plurality of optional analog processing functionalities 112 (including optional analog processing functionality 112-1, optional analog processing functionality 112-2, and any quantity of additional optional analog processing functionalities 112 through optional analog processing functionality 112-N), a plurality of variable gain amplifiers 114 (including variable gain amplifier 114-1, variable gain amplifier 114-2, and any quantity of additional optional variable gain amplifiers 114 through optional variable gain amplifier 114-N), and a plurality of analog to digital converters 116 (including analog to digital converter 116-1, analog to digital converter 116-2, and any quantity of optional analog to digital converters 116 through optional analog to digital converter 116-N).

The components of exemplary GNSS receiver 100B operate according to the description above with reference to GNSS receiver 100A described above. GNSS receiver 100B differs from GNSS receiver 100A in that the plurality of automatic gain controllers (AGC) 118 (including automatic gain controller 118-1, automatic gain controller 118-2, and any quantity of optional automatic gain controllers 118 through optional automatic gain controller 118-N) are included as part of the digital processing functionality instead of as a part of the radio frequency front end.

FIG. 2 is a flow diagram illustrating one exemplary embodiment of a method 200 of detecting an interference signal present in a first frequency of a first analog GNSS signal received from at least one radio frequency input. Method 200 begins at block 202 with adjusting a first gain of a first frequency range of a first analog global navigation satellite system received from at least one radio frequency input by a first amount. Method 200 proceeds to block 204 with adjusting a second gain of a second frequency range of a second analog global navigation satellite system received from at least one radio frequency input by a second amount. Method 200 proceeds to optional block 206 with adjusting a third gain of a third frequency range of a third analog global navigation satellite system received from at least one radio frequency input by a third amount.

Method 200 proceeds to optional block 208 with analyzing the first signal level of the first analog GNSS signal after the first gain is applied to the first frequency range of the first analog GNSS signal. Method 200 proceeds to optional block 210 with analyzing the second signal level of the second analog GNSS signal after the second gain is applied to the second frequency range of the second analog GNSS signal. Method 200 proceeds to optional block 212 with analyzing the third signal level of the third analog GNSS signal after the third gain is applied to the third frequency range of the third analog GNSS signal.

Method 200 proceeds to block 214 with comparing the first amount of adjustment of the first gain of the first frequency range with the second amount of adjustment of the second gain of the second frequency range. Method 200 proceeds to block 216 with detecting the first interference signal present in the first frequency range or the second frequency range when a first amount of adjustment of the first gain of the first frequency range differs from a second amount of adjustment of the second gain of the second frequency range by more than a first threshold.

Method 200 proceeds to optional block 218 with comparing the second amount of adjustment of the second gain of the second frequency range with a third amount of adjustment of a third gain of a third frequency range. Method 200 proceeds to optional block 220 with detecting the second interference signal in the second frequency range or the third frequency range when the second amount of adjustment of the second gain in the second frequency range differs from a third amount of adjustment of the third gain of the third frequency range by more than a second threshold. In exemplary embodiments, optional blocks 218 and 220 are only performed when a first interference signal is not determined be present in the second frequency range. This enables the system to be more confident that an interference signal is not in the second frequency range.

Method 200 proceeds to optional block 222 with comparing the third amount of adjustment of the third gain of the third frequency range with the first amount of adjustment of the first gain of the first frequency range. Method 200 proceeds to optional block 224 with detecting the third interference signal in the third frequency range or the first frequency range when the third amount of adjustment of the third gain in the third frequency range differs from the first amount of adjustment of the first gain of the first frequency range by more than a third threshold. In exemplary embodiments, optional block 222 and 224 are only performed when a first interference signal and/or a second interference signal is not determined to be present in the third frequency range or the first frequency range. This enable the system to be more confident that an interference signal is not in the third frequency range or the first frequency range. In exemplary embodiments, the first threshold, second threshold, and third threshold are the same. In other embodiments, some or all of the first threshold, the second threshold, and the third threshold are distinct.

Method 200 proceeds to optional block 226 with converting the first analog GNSS signal to a digital GNSS signal. Method 200 proceeds to optional block 228 with converting the second analog GNSS signal to a second digital GNSS signal. Method 200 proceeds to optional block 230 with converting the third analog GNSS signal to a third digital GNSS signal. Method 200 proceeds to optional block 232 with mitigating, excluding, filtering, reducing, and/or removing the first interference signal. Method 200 proceeds to optional block 234 with mitigating, excluding, filtering, reducing, and/or removing the second interference signal. Method 200 proceeds to optional block 236 with mitigating, excluding, filtering, reducing, and/or removing the second interference signal.

Although specific embodiments have been illustrated and described herein, it will be appreciated by those of ordinary skill in the art that any arrangement, which is calculated to achieve the same purpose, may be substituted for the specific embodiments shown. Specifically, in other embodiments, other means of gain control and/or sampling are used. For example, instead of automatic gain controllers and analog to digital converters, a simple threshold leveling and comparator can be used to digitize the input signal. For example, the system could set the threshold level to obtain required percentage of digital −1, 0, and 1 samples. In exemplary embodiments, 80% of the time the samples output could be 0, 10% of the time the samples could be +1, and 10% of the time the samples could be −1. In exemplary embodiments, the threshold level can be adjusted in the same way that a gain is adjusted and the interference detection approaches described herein can be still be used. Therefore, it is manifestly intended that this invention be limited only by the claims and the equivalents thereof.

EXAMPLE EMBODIMENTS

Example 1 includes a global navigation satellite system receiver comprising: a radio frequency front end including: at least one radio frequency input; a first variable gain amplifier configured to adjust a first gain of a first frequency range of a first analog global navigation satellite system signal received from the at least one radio frequency input by a first amount; and a second variable gain amplifier configured to adjust a second gain of a second frequency range of a second analog global navigation satellite system signal received from the at least one radio frequency input by a second amount; and a digital processing functionality configured to: compare the first amount of adjustment of the first gain of the first frequency range with the second amount of adjustment of the second gain of the second frequency range; and detect a first interference signal present in the first frequency range or the second frequency range when the first amount of adjustment of the first gain of the first frequency range differs from the second amount of adjustment of the second gain of the second frequency range by more than a first threshold amount.

Example 2 includes the global navigation satellite system receiver of Example 1, wherein the radio frequency front end further includes: a first analog to digital converter configured to receive the first analog global navigation satellite system signal and to convert the first analog global navigation satellite system signal to a first digital global navigation satellite system signal; and a second analog to digital converter configured to receive the second analog global navigation satellite system signal and to convert the second analog global navigation satellite system signal to a second digital global navigation satellite system signal.

Example 3 includes the global navigation satellite system receiver of any of Examples 1-2, further comprising: wherein the first variable gain amplifier is configured to receive the first analog global navigation satellite systems signal from the at least one radio frequency input and to apply the first gain to the first frequency range of the first analog global navigation satellite system signal received from the at least one radio frequency input by the first amount; a first automatic gain controller configured to analyze a first signal level of the first analog global navigation satellite system signal after the first gain is applied to the first frequency range by the first variable gain amplifier and to adjust the first gain applied to the first frequency range of the first analog global navigation satellite system signal by the first amount to maintain the first signal level of the first analog global navigation satellite system signal; wherein the second variable gain amplifier is configured to receive the second analog global navigation satellite system signal from the at least one radio frequency input and to apply the second gain to the second frequency range of the second analog global navigation satellite system signal received from the at least one radio frequency input by the second amount; and a second automatic gain controller configured to analyze a second signal level of the second analog global navigation satellite system signal after the second gain is applied to the second frequency range by the second variable gain amplifier and to adjust the second gain applied to the second frequency range of the second analog global navigation satellite system signal by the second amount to maintain the second signal level of the second analog global navigation satellite system signal.

Example 4 includes the global navigation satellite system receiver of any of Examples 1-3, further comprising: wherein the first variable gain amplifier is configured to receive the first analog global navigation satellite system signal from the at least one radio frequency input and to apply the first gain to the first frequency range of the first analog global navigation satellite system signal received from the at least one radio frequency input by the first amount; wherein the digital processing functionality is further configured to analyze a first signal level of the first analog global navigation satellite system signal after the first gain is applied to the first frequency range by the first variable gain amplifier and to adjust the first gain applied to the first frequency range of the first analog global navigation satellite system signal by the first amount to maintain the first signal level of the first analog global navigation satellite system signal; wherein the second variable gain amplifier is configured to receive the second analog global navigation satellite system signal from the at least one radio frequency input and to apply the second gain to the second frequency range of the second analog global navigation satellite system signal received from the at least one radio frequency input by the second amount; and wherein the digital processing functionality is further configured to analyze a second signal level of the second analog global navigation satellite system signal after the second gain is applied to the second frequency range by the second variable gain amplifier and to adjust the second gain applied to the second frequency range of the second analog global navigation satellite system signal by the second amount to maintain the second signal level of the second analog global navigation satellite system signal.

Example 5 includes the global navigation satellite system receiver of any of Examples 1-4, further comprising: wherein the radio frequency front end further includes: a third variable gain amplifier configured to adjust a third gain of a third frequency range of a third analog global navigation satellite system signal received from the at least one radio frequency input by a third amount; wherein the digital processing functionality is further configured to perform the following when the first interference signal is not detected as present in the second frequency range: compare the second amount of adjustment of the second gain of the second frequency range with the third amount of adjustment of the third gain of the third frequency range; and detect a second interference signal present in the second frequency range or the third frequency range when the second amount of adjustment of the second gain of the second frequency range differs from the third amount of adjustment of the third gain of the third frequency range by more than a second threshold amount.

Example 6 includes the global navigation satellite system receiver of Example 5, wherein the digital processing functionality is further configured to perform the following when the second interference signal is not detected as present in the third frequency range: compare the third amount of adjustment of the third gain of the third frequency range with the first amount of adjustment of the first gain of the first frequency range; and detect a third interference signal present in the third frequency range or the first frequency range when the third amount of adjustment of the third gain of the third frequency range differs from the first amount of adjustment of the first gain of the first frequency range by more than a third threshold amount.

Example 7 includes the global navigation satellite system receiver of any of Examples 1-6, wherein the radio frequency front end further includes a first analog processing functionality communicatively coupled between the at least one radio frequency input and the first variable gain amplifier; and wherein the radio frequency front end further includes a second analog processing functionality communicatively coupled between the at least one radio frequency input and the second variable gain amplifier.

Example 8 includes the global navigation satellite system receiver of Example 7, wherein at least one of the first analog processing functionality and the second analog processing functionality includes at least one of a mixer and an amplifier.

Example 9 includes a method of detecting an interference signal present in a first frequency of a first analog global navigation satellite system signal received from at least one radio frequency input, comprising: adjusting a first gain of a first frequency range of a first analog global navigation satellite system signal received from the at least one radio frequency input by a first amount; adjusting a second gain of a second frequency range of a second analog global navigation satellite system signal received from the at least one radio frequency input by a second amount; comparing the first amount of adjustment of the first gain of the first frequency range with the second amount of adjustment of the second gain of the second frequency range; and detecting a first interference signal present in the first frequency range or the second frequency range when the first amount of adjustment of the first gain of the first frequency range differs from the second amount of adjustment of the second gain of the second frequency range by more than a first threshold amount.

Example 10 includes the method of Example 9, further comprising: converting the first analog global navigation satellite system signal to a first digital global navigation satellite system signal; and converting the second analog global navigation satellite system signal to a second digital global navigation satellite system signal.

Example 11 includes the method of any of Examples 9-10, further comprising: analyzing a first signal level of the first analog global navigation system signal after the first gain is applied to the first frequency range of the first analog global navigation satellite system signal; and analyzing a second signal level of the second analog global navigation system signal after the second gain is applied to the second frequency range of the second analog global navigation satellite system signal.

Example 12 includes the method of any of Examples 9-11, further comprising: comparing the first amount of adjustment of the first gain of the first frequency range with the second amount of adjustment of the second gain of the second frequency range by correlating the first amount of adjustment of the first gain of the first frequency range with the second amount of adjustment of the second gain of the second frequency range.

Example 13 includes the method of any of Examples 9-12, further comprising: adjusting a third gain of a third frequency range of a third analog global navigation satellite system signal received from the at least one radio frequency input by a third amount; comparing the second amount of adjustment of the second gain of the second frequency range with the third amount of adjustment of the third gain of the third frequency range; and detecting a second interference signal present in the second frequency range or the third frequency range when the second amount of adjustment of the second gain of the second frequency range differs from the third amount of adjustment of the third gain of the third frequency range by more than a second threshold amount.

Example 14 includes the method of any of Examples 9-12, further comprising the following: adjusting a third gain of a third frequency range of a third analog global navigation satellite system signal received from the at least one radio frequency input by a third amount when the first interference signal is not detected as present in the second frequency range; comparing the second amount of adjustment of the second gain of the second frequency range with the third amount of adjustment of the third gain of the third frequency range; and detecting a second interference signal present in the second frequency range or the third frequency range when the second amount of adjustment of the second gain of the second frequency range differs from the third amount of adjustment of the third gain of the third frequency range by more than a second threshold amount and when the first interference signal is not detected as present in the second frequency range.

Example 15 includes the method of Example 14, further comprising the following only when the second interference signal is not detected as present in the third frequency range: comparing the third amount of adjustment of the third gain of the third frequency range with the first amount of adjustment of the first gain of the first frequency range; and detecting a third interference signal present in the third frequency range or the first frequency range when the third amount of adjustment of the third gain of the third frequency range differs from the first amount of adjustment of the first gain of the first frequency range by more than a third threshold amount.

Example 16 includes the method of any of Examples 9-15, further comprising at least one of: processing the first analog global navigation satellite system signal received from the at least one radio frequency input before adjusting the first gain of the first frequency range of the first analog global navigation satellite system signal; and processing the second analog global navigation satellite system signal received from the at least one radio frequency input before adjusting the second gain of the second frequency range of the second analog global navigation satellite system signal.

Example 17 includes the method of any of Examples 9-16, further comprising at least one of: down-converting the first analog global navigation satellite system signal from a first radio frequency spectrum to a first intermediate frequency spectrum before adjusting the first gain of the first frequency range of the first analog global navigation satellite system signal; and down-converting the second analog global navigation satellite system signal from a second radio frequency spectrum to a second intermediate frequency spectrum before adjusting the second gain of the second frequency range of the second analog global navigation satellite system signal.

Example 18 includes a programmable processor of a global navigation satellite system receiver comprising: wherein the programmable processor is configured to compare a first amount of adjustment of a first gain of a first frequency range of a first analog global navigation satellite system signal received from at least one radio frequency input with a second amount of adjustment of a second gain of a second frequency range of a second analog global navigation satellite system signal received from the at least one radio frequency input; and wherein the programmable processor is further configured to detect a first interference signal present in the first frequency range or the second frequency range when the first amount of adjustment of the first gain of the first frequency range differs from the second amount of adjustment of the second gain of the second frequency range by more than a first threshold amount.

Example 19 includes the programmable processor of Example 18, wherein the programmable processor is further configured to: analyze a first signal level of the first analog global navigation system signal after the first gain is applied to the first frequency range of the first analog global navigation satellite system signal; and analyze a second signal level of the second analog global navigation system signal after the second gain is applied to the second frequency range of the second analog global navigation satellite system signal.

Example 20 includes the programmable processor of any of Examples 18-19, wherein the programmable processor is further configured to: compare the second amount of adjustment of the second gain of the second frequency range of the second analog global navigation system signal received from the at least one radio frequency input with a third amount of adjustment of a third gain of a third frequency range of a third analog global navigation satellite system signal received from the at least one radio frequency input when the first interference signal is not detected present in the second frequency range; and detect a second interference signal present in the second frequency range or the third frequency range when the second amount of adjustment of the second gain of the second frequency range differs from the third amount of adjustment of the third gain of the third frequency range by more than a second threshold amount and when the first interference signal is not detected present in the second frequency range.

What is claimed is:

1. A global navigation satellite system receiver comprising:
    a radio frequency front end including:
        at least one radio frequency input;
        a first variable gain amplifier configured to adjust a first gain of a first frequency range of a first analog global navigation satellite system signal received from the at least one radio frequency input by a first amount; and
        a second variable gain amplifier configured to adjust a second gain of a second frequency range of a second analog global navigation satellite system signal received from the at least one radio frequency input by a second amount; and
    a digital processing functionality configured to:
        compare the first amount of adjustment of the first gain of the first frequency range with the second amount of adjustment of the second gain of the second frequency range; and
        detect a first interference signal present in the first frequency range or the second frequency range when the first amount of adjustment of the first gain of the first frequency range differs from the second amount of adjustment of the second gain of the second frequency range by more than a first threshold amount.

2. The global navigation satellite system receiver of claim 1, wherein the radio frequency front end further includes:
    a first analog to digital converter configured to receive the first analog global navigation satellite system signal and to convert the first analog global navigation satellite system signal to a first digital global navigation satellite system signal; and
    a second analog to digital converter configured to receive the second analog global navigation satellite system signal and to convert the second analog global navigation satellite system signal to a second digital global navigation satellite system signal.

3. The global navigation satellite system receiver of claim 1, further comprising:
    wherein the first variable gain amplifier is configured to receive the first analog global navigation satellite systems signal from the at least one radio frequency input and to apply the first gain to the first frequency range of the first analog global navigation satellite system signal received from the at least one radio frequency input by the first amount;
    a first automatic gain controller configured to analyze a first signal level of the first analog global navigation satellite system signal after the first gain is applied to the first frequency range by the first variable gain amplifier and to adjust the first gain applied to the first frequency range of the first analog global navigation satellite system signal by the first amount to maintain the first signal level of the first analog global navigation satellite system signal;
    wherein the second variable gain amplifier is configured to receive the second analog global navigation satellite system signal from the at least one radio frequency input and to apply the second gain to the second frequency range of the second analog global navigation satellite system signal received from the at least one radio frequency input by the second amount; and
    a second automatic gain controller configured to analyze a second signal level of the second analog global navigation satellite system signal after the second gain is applied to the second frequency range by the second variable gain amplifier and to adjust the second gain applied to the second frequency range of the second analog global navigation satellite system signal by the second amount to maintain the second signal level of the second analog global navigation satellite system signal.

4. The global navigation satellite system receiver of claim 1, further comprising:
    wherein the first variable gain amplifier is configured to receive the first analog global navigation satellite system signal from the at least one radio frequency input and to apply the first gain to the first frequency range of the first analog global navigation satellite system signal received from the at least one radio frequency input by the first amount;
    wherein the digital processing functionality is further configured to analyze a first signal level of the first analog global navigation satellite system signal after the first gain is applied to the first frequency range by the first variable gain amplifier and to adjust the first gain applied to the first frequency range of the first analog global navigation satellite system signal by the first amount to maintain the first signal level of the first analog global navigation satellite system signal;
    wherein the second variable gain amplifier is configured to receive the second analog global navigation satellite system signal from the at least one radio frequency input and to apply the second gain to the second frequency range of the second analog global navigation satellite system signal received from the at least one radio frequency input by the second amount; and
    wherein the digital processing functionality is further configured to analyze a second signal level of the second analog global navigation satellite system signal after the second gain is applied to the second frequency range by the second variable gain amplifier and to adjust the second gain applied to the second frequency range of the second analog global navigation satellite system signal by the second amount to maintain the second signal level of the second analog global navigation satellite system signal.

5. The global navigation satellite system receiver of claim 1, further comprising:
    wherein the radio frequency front end further includes:
        a third variable gain amplifier configured to adjust a third gain of a third frequency range of a third analog global navigation satellite system signal received from the at least one radio frequency input by a third amount;
    wherein the digital processing functionality is further configured to perform the following when the first interference signal is not detected as present in the second frequency range:
        compare the second amount of adjustment of the second gain of the second frequency range with the third amount of adjustment of the third gain of the third frequency range; and detect a second interference signal present in the second frequency range or the third frequency range when the second amount of adjustment of the second gain of the second frequency range differs from the third amount of adjustment of the third gain of the third frequency range by more than a second threshold amount.

6. The global navigation satellite system receiver of claim 5, wherein the digital processing functionality is further configured to perform the following when the second interference signal is not detected as present in the third frequency range:
compare the third amount of adjustment of the third gain of the third frequency range with the first amount of adjustment of the first gain of the first frequency range; and
detect a third interference signal present in the third frequency range or the first frequency range when the third amount of adjustment of the third gain of the third frequency range differs from the first amount of adjustment of the first gain of the first frequency range by more than a third threshold amount.

7. The global navigation satellite system receiver of claim 1, wherein the radio frequency front end further includes a first analog processing functionality communicatively coupled between the at least one radio frequency input and the first variable gain amplifier; and
wherein the radio frequency front end further includes a second analog processing functionality communicatively coupled between the at least one radio frequency input and the second variable gain amplifier.

8. The global navigation satellite system receiver of claim 7, wherein at least one of the first analog processing functionality and the second analog processing functionality includes at least one of a mixer and an amplifier.

9. A method of detecting an interference signal present in a first frequency of a first analog global navigation satellite system signal received from at least one radio frequency input, comprising:
adjusting a first gain of a first frequency range of a first analog global navigation satellite system signal received from the at least one radio frequency input by a first amount;
adjusting a second gain of a second frequency range of a second analog global navigation satellite system signal received from the at least one radio frequency input by a second amount;
comparing the first amount of adjustment of the first gain of the first frequency range with the second amount of adjustment of the second gain of the second frequency range; and
detecting a first interference signal present in the first frequency range or the second frequency range when the first amount of adjustment of the first gain of the first frequency range differs from the second amount of adjustment of the second gain of the second frequency range by more than a first threshold amount.

10. The method of claim 9, further comprising:
converting the first analog global navigation satellite system signal to a first digital global navigation satellite system signal; and
converting the second analog global navigation satellite system signal to a second digital global navigation satellite system signal.

11. The method of claim 9, further comprising:
analyzing a first signal level of the first analog global navigation system signal after the first gain is applied to the first frequency range of the first analog global navigation satellite system signal; and
analyzing a second signal level of the second analog global navigation system signal after the second gain is applied to the second frequency range of the second analog global navigation satellite system signal.

12. The method of claim 9, further comprising:
comparing the first amount of adjustment of the first gain of the first frequency range with the second amount of adjustment of the second gain of the second frequency range by correlating the first amount of adjustment of the first gain of the first frequency range with the second amount of adjustment of the second gain of the second frequency range.

13. The method of claim 9, further comprising:
adjusting a third gain of a third frequency range of a third analog global navigation satellite system signal received from the at least one radio frequency input by a third amount;
comparing the second amount of adjustment of the second gain of the second frequency range with the third amount of adjustment of the third gain of the third frequency range; and
detecting a second interference signal present in the second frequency range or the third frequency range when the second amount of adjustment of the second gain of the second frequency range differs from the third amount of adjustment of the third gain of the third frequency range by more than a second threshold amount.

14. The method of claim 9, further comprising the following:
adjusting a third gain of a third frequency range of a third analog global navigation satellite system signal received from the at least one radio frequency input by a third amount;
comparing the second amount of adjustment of the second gain of the second frequency range with the third amount of adjustment of the third gain of the third frequency range when the first interference signal is not detected as present in the second frequency range; and
detecting a second interference signal present in the second frequency range or the third frequency range when the second amount of adjustment of the second gain of the second frequency range differs from the third amount of adjustment of the third gain of the third frequency range by more than a second threshold amount and when the first interference signal is not detected as present in the second frequency range.

15. The method of claim 14, further comprising the following only when the second interference signal is not detected as present in the third frequency range:
comparing the third amount of adjustment of the third gain of the third frequency range with the first amount of adjustment of the first gain of the first frequency range; and
detecting a third interference signal present in the third frequency range or the first frequency range when the third amount of adjustment of the third gain of the third frequency range differs from the first amount of adjustment of the first gain of the first frequency range by more than a third threshold amount.

16. The method of claim 9, further comprising at least one of:
processing the first analog global navigation satellite system signal received from the at least one radio frequency input before adjusting the first gain of the first frequency range of the first analog global navigation satellite system signal; and processing the second analog global navigation satellite system signal received from the at least one radio frequency input before adjusting the second gain of the second frequency range of the second analog global navigation satellite system signal.

17. The method of claim 9, further comprising at least one of:

down-converting the first analog global navigation satellite system signal from a first radio frequency spectrum to a first intermediate frequency spectrum before adjusting the first gain of the first frequency range of the first analog global navigation satellite system signal; and down-converting the second analog global navigation satellite system signal from a second radio frequency spectrum to a second intermediate frequency spectrum before adjusting the second gain of the second frequency range of the second analog global navigation satellite system signal.

18. A programmable processor of a global navigation satellite system receiver comprising:

wherein the programmable processor is configured to compare a first amount of adjustment of a first gain of a first frequency range of a first analog global navigation satellite system signal received from at least one radio frequency input with a second amount of adjustment of a second gain of a second frequency range of a second analog global navigation satellite system signal received from the at least one radio frequency input; and wherein the programmable processor is further configured to detect a first interference signal present in the first frequency range or the second frequency range when the first amount of adjustment of the first gain of the first frequency range differs from the second amount of adjustment of the second gain of the second frequency range by more than a first threshold amount.

19. The programmable processor of claim 18, wherein the programmable processor is further configured to:

analyze a first signal level of the first analog global navigation system signal after the first gain is applied to the first frequency range of the first analog global navigation satellite system signal; and analyze a second signal level of the second analog global navigation system signal after the second gain is applied to the second frequency range of the second analog global navigation satellite system signal.

20. The programmable processor of claim 18, wherein the programmable processor is further configured to:

compare the second amount of adjustment of the second gain of the second frequency range of the second analog global navigation system signal received from the at least one radio frequency input with a third amount of adjustment of a third gain of a third frequency range of a third analog global navigation satellite system signal received from the at least one radio frequency input when the first interference signal is not detected present in the second frequency range; and detect a second interference signal present in the second frequency range or the third frequency range when the second amount of adjustment of the second gain of the second frequency range differs from the third amount of adjustment of the third gain of the third frequency range by more than a second threshold amount and when the first interference signal is not detected present in the second frequency range.

* * * * *